United States Patent [19]

Melachouris et al.

[11] 4,163,069

[45] Jul. 31, 1979

[54] NON-FAT DRY MILK SUBSTITUTE PRODUCT

[75] Inventors: Nicholas Melachouris, White Plains; Brenda B. Fracaroli, Ossining; Constance R. Corbett, White Plains, all of N.Y.

[73] Assignee: Stauffer Chemical Company, Westport, Conn.

[21] Appl. No.: 840,684

[22] Filed: Oct. 11, 1977

[51] Int. Cl.² .............................................. A23C 21/00
[52] U.S. Cl. .................................... 426/582; 426/580; 426/583; 426/588; 426/654; 426/657
[58] Field of Search .............................. 426/41–43, 426/583, 657, 582, 654, 491, 580, 588

[56] References Cited

U.S. PATENT DOCUMENTS

| 2,081,273 | 5/1937 | Hoermann et al. | 426/582 |
| 2,606,181 | 8/1952 | Pratt et al. | 260/122 |
| 3,620,757 | 11/1971 | Ellinger | 426/580 |
| 3,840,996 | 10/1974 | Grindstaff et al. | 34/9 |
| 3,873,751 | 3/1975 | Arndt | 426/583 |

FOREIGN PATENT DOCUMENTS 2603416  8/1976  Fed. Rep. of Germany ........... 426/582

*Primary Examiner*—S. Leon Bashore
*Assistant Examiner*—Peter Chin
*Attorney, Agent, or Firm*—Michael E. Zall

[57] ABSTRACT

A cheese product containing a non-fat dry milk substitute product. The non-fat dry milk substitute product contains therein lactalbumin, a modified whey solids product, and a texture improving amount of sodium hexametaphosphate. The protein content of the non-fat dry milk substitute product is from about 17% to about 30%, by weight, dry basis.

45 Claims, No Drawings

NON-FAT DRY MILK SUBSTITUTE PRODUCT

BACKGROUND OF THE INVENTION

1. Field of the Invention

The present invention relates to a cheese product containing a non-fat dry milk substitute product, and more particularly relates to a non-fat dry milk substitute product comprising lactalbumin, a modified whey solids product and sodium hexametaphosphate.

At the present time, there is considerable interest in the more efficient utilization of animal protein, including the recovery of animal protein from products formally considered to be waste materials of little potential use. Specifically, in the manufacture of cheese from milk, approximately half of the milk solids are coagulated as cheese, the remaining solids being contained in the residue or whey. Several processes have been developed for the recovery of valuable protein from whey and the separation of undesirable whey constituents from protein. Processes for treating whey are disclosed in U.S. Pat. No. 2,606,181, U.S. Pat. No. 3,002,823, U.S. Pat. No. 3,060,219, U.S. Pat. No. 3,547,900 and its Reissue U.S. Pat. No. Re. 27,806, U.S. Pat. No. 3,560,219 and U.S. Pat. No. 4,036,999. The entire disclosures of all of these patents are incorporated herein by reference.

2. Description of the Prior Art

Accompanying these developments in the processing of whey is the development and formulation of numerous products which contain whey and whey products. Specifically, whey and whey products are being used as non-fat dry milk substitute products for the non-fat dry milk normally used in cheese products.

For example, the use of a modified whey solids product in cheese products, in particular pasteurized process cheese food and pasteurized process cheese spread, as a non-fat dry milk substitute product is fully described in the assignee's copending U.S. patent application Ser. No. 680,613 filed on Apr. 26, 1976 and Ser. No. 818,645 filed on July 25, 1977, and concurrently filed Ser. No. 840,683, filed on Nov. 11, 1977 (Stauffer Case C-5072), the entire disclosures of which are herein incorporated by reference.

There is, however, still a need for a low cost non-fat milk substitute product for use in cheese products. Such a product would considerably lighten the economic burden to both the consumer and the manufacturer. While the United States consumption of American pasteurized process cheese (which does not contain non-fat dry milk) increased only 9% between 1969 and 1970, the consumption of pasteurized process cheese foods and pasteurized process cheese spread (which do contain non-fat dry milk) increased over 60% in 1970. Additionally, in the last few years, the price of non-fat dry milk more than tripled to about 65¢ per pound in 1976.

Whey and whey products, due to their low-cost and availability are a logical source for such non-fat dry milk substitute products. Difficulties arise, however, in formulating, from the numerous whey products which can be produced, a non-fat dry milk substitute product which is not only low in cost, but also does not adversely effect the properties of the cheese product.

It is thus an object of this invention to provide a non-fat dry milk substitute product for use in cheese products which is low in cost and does not adversely effect the properties of the cheese product.

SUMMARY OF THE INVENTION

In accordance with this invention there is provided a non-fat dry milk substitute product comprising lactalbumin, a cheese texture improving amount of sodium hexameta phosphate and a modified whey solids product derived from a process selected from the group consisting of:
(a) adding a divalent metal ion to a raw whey feed and adjusting the pH to a value above above 6 at a temperature below about 140° F. (60° C.) thereby causing precipitation of the modified whey solids product, and
(b) adjusting the pH of a raw whey feed containing at least about 20% acid whey to a value between about 6.5 and about 8, thereby causing the precipitation of the modified whey solids product,
wherein the protein content of the non-fat dry milk substitute product is from about 17% to about 30%, (by weight, dry basis).

DETAILED DESCRIPTION OF THE INVENTION

Preferably, the non-fat dry milk substitute product is additionally comprised of dried sweet whey; dried deproteinized whey, delactosed-deproteinized whey, or mixtures thereof, all of which will be described in detail below.

Preferably the protein content of the non-fat dry milk substitute product is from about 19% to about 23% protein; by weight, dry basis.

A particularly preferred non-fat dry milk substitute product contains about 20% protein.

It has been found that at protein concentrations below about 17% the cheese product has less desirable functional properties and at protein concentrations above about 30% the non-fat dry milk substitute product becomes too expensive.

The protein concentration is determined herein by total Kjeldahl nitrogen. The protein concentration is equal to the total nitrogen times an appropriate constant. The constant relates the total nitrogen to protein, i.e. (6.38) for cheese whey proteins, see Methods of Analysis—A.O.A.C., 16, (1970) 11th Ed.

It is preferred that the non-fat dry milk substitute product contain about 9% to about 15% by weight, dry basis, lactalbumin.

A particularly preferred non-fat dry milk substitute product contains a weight ratio (dry basis) of modified whey solids to lactalbumin of from about 2:1 to about 5:1.

A cheese texture improving amount of sodium hexametaphosphate is incorporated in the non-fat dry milk substitute product. The weight ratio (dry basis) of sodium hexametaphosphate to lactalbumin is preferably from about 0.05:1 to about 0.20:1.

By the use of the term "cheese texture improving amount" it is meant an amount of sodium hexametaphosphate sufficient to improve the texture and body of the cheese product, i.e., improve hardness, brittleness, adhesiveness and/or cohesiveness, to a level which is acceptable for the cheese product.

Optionally the non-fat dry milk substitute product has contained therein dried sweet whey. The dried sweet whey is preferably present in a weight ratio (dry basis) of dried sweet whey to lactalbumin of from about 2:1 to about 5:1. It is particularly preferred that the quantity of dried sweet whey in the non-fat dry milk substitute product be about the same as the quantity of modified whey solids.

Additionally the non-fat dry milk substitute product can have contained therein a dried deproteinized whey. Preferably the dried deproteinized whey is present in a weight ratio (dry basis) of dried deproteinized whey to lactalbumin of from about 2:1 to about 4:1. It is particularly preferred that the weight ratio be about 3:1.

Optionally the non-fat dry milk substitute product may have contained therein a delactosed-deproteinized whey. Preferably this whey is present in a weight ratio (dry basis) of delactosed-deproteinized whey to lactalbumin of from about 3:1 to about 4:1. More particularly it is preferred that the weight ratio be about 3.5:1.

This invention includes the use of the optional ingredients either alone or as mixtures thereof, as long as the protein content of the non-fat dry milk substitute product is within the prescribed limits.

The non-fat dry milk substitute product of this invention is preferably substantially free of water, although liquid concentrates may be used.

Preferably the non-fat dry milk substitute product completely replaces or replaces a substantial portion of the expensive non-fat dry milk or conventional whey products in the cheese products. Particularly preferred cheese product compositions have been formulated wherein at least 75%, by weight (dry basis) of the non-fat dry milk in the cheese product has been replaced by the non-fat dry milk substitute product of this invention.

Cheese products, in particular pasteurized cheese foods and spreads, usually contain from about 1% to about 12% non-fat dry milk, by weight of cheese product. When the desired cheese product is an imitation cheese spread the non-fat dry milk substitute product may be present in the imitation cheese spread from about 1% to about 20%, by weight. It is therefore particularly preferred that the non-fat dry milk substitute product be present in the cheese product at the same percentages. It is particularly preferred that the non-fat dry milk substitute product be present in the cheese product from about 2% to about 6% by weight of the cheese product.

The non-fat dry milk substitute product of this invention may be formulated by the mixing of the ingredients.

Optionally the non-fat dry milk substitute product has contained therein dried sweet whey. The dried sweet whey is preferably present in a weight ratio (dry basis) of dried sweet whey to lactalbumin of from about 2:1 to about 5:1. It is particularly preferred that the quantity of dried sweet whey in the non-fat dry milk substitue product be about the same as the quantity of modified whey solids.

Additionally the non-fat dry milk substitute product can have contained therein a dried deproteinized whey. Preferably the dried deproteinized whey is present in a weight ratio (dry basis) of dried deproteinized whey to lactalbumin of from about 2:1 to about 4:1. It is particularly preferred that the weight ratio be about 3:1.

Optionally the non-fat dry milk substitute product may have contained therein a delactosed-deproteinized whey. Preferably this whey is present in a weight ratio (dry basis) of delactosed-deproteinized whey to lactalbumin of from about 3:1 to about 4:1. More particularly it is preferred that the weight ratio be about 3.5:1.

The non-fat dry milk substitute product may be formulated from dried and/or liquid ingredients and co-dried, if necessary to a product which is substantially free of water. Optionally, the dried and/or liquid ingredients may be added to the ingredients of the cheese product and the cheese product dried to the desired moisture content.

The non-fat dry milk substitute product or ingredients thereof are blended with the cheese by known methods in the art.

CHEESE PRODUCT

Generally, the term "cheese product" is meant to include:
(a) pasteurized process cheese;
(b) pasteurized process cheese food
(c) pasteurized process cheese spread; and
(d) imitation cheese spread.

All the above cheese products are well known in the art, e.g., Webb et al., Fundamentals of Dairy Chemistry, Chapter 2, AVI Publishing Co., Westport, Conn. (1965).

Cheese products (a), (b) and (c) are legally defined in the United States in the Code of Federal Regulations, April 1976, Title 21, Part 19 Cheeses, Processed Cheese, Cheese Foods, Cheese Spreads and Related Foods, Pages 59-115, which is incorporated herein by reference.

Generally, pasteurized process cheese is prepared by comminuting and mixing, with the aid of heat one or more cheeses of the same or different varieties, with an emulsifying agent into a homogenous plastic mass. One or more optional ingredients may also be used, i.e. an acidifying agent, dairy ingredients such as cream, anhydrous milk fat, dehydrated cream; water; salt; food grade artificial coloring; spices; flavorings; mold inhibiting agents; or anti-sticking agents.

During its preparation, the pasteurized process cheese is heated to a temperature of at least 150° F. (66° C.). The moisture content of pasteurized process cheese is not more than 43%, by weight, of cheese product, and the fat content of the solids not less than 47%, by weight of cheese product.

It should be noted however, that by definition pasteurized process cheese does not contain non-fat dry milk nor non-fat dry milk substitute products and is thus not included within the term "cheese product" as used herein.

Generally, pasteurized process cheese food is prepared in the same manner as pasteurized process cheese, except that one or more additional dairy ingredients may be included therein i.e. cream, milk, skim milk, butter milk, cheese whey, any of foregoing from which part of the water has been removed, albumin from cheese whey, skim milk cheese, etc. The moisture content is not more than 44%, by weight of cheese products, and the fat content not less than 23%, by weight of cheese product.

Generally, pasteurized process cheese spread is prepared in the same manner as pasteurized process cheese food, except that the pasteurized process cheese spread may have contained therein a stabilizer to prevent separation of the ingredients, i.e. carob bean gum, gum karaya, gum tragacanth, guar gum, gelatin, cellulose gum, carrageenan, oat gum, algin, propylene glycol alginate, or xanthan gum, to the extent of 0.8%, by weight.

Additionally a sweetening agent may be added, i.e. sugar dextrose, corn sugar, corn syrup solids, glucose syrup solids, maltose, malt syrup and hydrolyzed lactose.

Pasteurized process cheese spread is spreadable at 70° F. (21.1° C.). The moisture content of pasteurized process cheese spread is more than 44%, by weight of cheese product, but not more than 60%, and the milk fat content is not less than 20%, by weight of cheese product.

Imitation cheese spread, which is not legally defined, is generally considered to be a cheese spread which comprises about 5–30% vegetable oil, by weight of cheese products, an example of such a product is described in U.S. Pat. No. 3,310,406.

WHEY

Whey is generally defined as the liquid byproduct from the manufacture of cheese and casein. Basically, whey is the by-product obtained by the acid or rennet coagulation of milk protein, i.e. casein, from milk. The whey obtained from acid coagulation is called acid whey and that obtained from rennet coagulation, sweet whey.

The acid coagulation of milk protein from milk involves either the addition of lactic acid producing bacteria (e.g., lactobacillus s.p.) or the direct acidification with mineral acid. Regardless of the method used to acidify milk, acidification is allowed to proceed until a pH of about 4.6 is reached. At this pH, casein becomes insolubilized and coagulates as cheese. The cheese produced by coagulation with lactic acid producing bacteria is commonly known as cottage cheese. The whey obtained by the separation and removal of this cheese curd is called cottage cheese whey. The whey obtained by direct acidification of milk with mineral acid is commonly known as casein whey.

Sweet whey is obtained by the separation and removal of coagulated casein produced by the addition of a proteolytic enzyme to milk. The proteolytic enzymes generally used are known as renin or pepsin or mixtures thereof. The addition of one or both of these enzymes to milk soon thereafter causes the coagulation of casein. The cheese curd thus produced is the product of the enzymatic coagulation of casein. Specific examples of cheese products produced by this general method are cheddar cheese, swiss cheese, and mozzarella cheese.

Generally, whey contains whey proteins, milk sugar (lactose), and salts.

LACTALBUMIN

The non-fat dry milk substitute product contains lactalbumin, a milk protein. Preferably the lactalbumin is present in the non-fat dry milk substitute product at about 9% to about 15%, by weight (dry basis) of the non-fat dry milk substitute product.

Lactalbumin is obtained as a high protein composition by the heating of whey causing coagulation of the whey proteins i.e lactalbumin. Lactalbumin has been commercially available for a number of years. Unfortunately, the product is gritty and insoluble and, therefore has limited use in foods. Unexpectedly the products of this invention utilize lactalbumin as an essential element therein, without any detrimental effects on the properties or taste of the cheese product.

Generally, there are two types of lactalbumin which may be used in the present invention: (a) isoelectric lactalbumin and (b) calcium lactalbumin.

Isoelectric lactalbumin is produced by boiling whey. Coagulation of the lactalbumin (at the pH of whey) begins at about 145° F. (63° C.) and is virtually complete at the boiling point. The isoelectric lactalbumin precipitate, contains about 66% of the nitrogen (Kjeldahl) in the whey and consists of about 75% to about 80% protein and about 5% to about 7% ash.

Lactalbumin is also recovered as a calcium salt, i.e. calcium lactalbumin. Lime as a 10% to 20% slurry is added to whey until a pH of about 6.8 is attained. The limed whey is brought to a boil in order to complete precipitation. The calcium lactalbumin precipitate contains about 75% of the total nitrogen (Kjedahl) in the whey and consists of about 35% to about 40% protein and about 35% to about 40% ash.

It is preferred to utilize isoelectric lactalbumin in the non-fat dry milk substitute product of this invention.

MODIFIED WHEY SOLIDS PRODUCT

The non-fat dry milk substitute product also contains modified whey solids product. Preferably the modified whey solids product is present in the non-fat dry milk substitute product in a weight ratio (dry basis) of modified whey solids product to lactalbumin of from about 2:1 to about 5:1.

The modified whey solids product suitable for use in the present invention can be produced by either the process described in the aforementioned U.S. Pat. No. 3,560,219 to Attebery, or the process described in the aforementioned U.S. Pat. No. 4,036,999 to Grindstaff.

The modified whey solids product, generally, has the following typical analysis, (by weight):
Protein (N×6.38)—about 15% to about 27%
Lactose—about 23% to about 54%
Minerals—about 20% to about 60%
Moisture—about 3% to about 6%
Lactate—about 2% to about 4%
Citrate—about 2% to about 3.5%
Fat—about 0.5% to about 2.5%

A typical mineral analysis of the modified whey solids product (by weight) is:
Phosphorus—about 3% to about 6%
Calcium—about 6% to about 12%
Potassium—about 1.0% to about 3%
Sodium—about 1.0% to about 3%
Magnesium—about 0.2% to about 2%

The product also contains a calcium phosphate-protein complex.

A commercially available and particularly preferred modified whey solids product for use in this invention is ENR-RO ™ from Stauffer Chemical Company, Food Ingredients Division, Westport, Conn.

This particularly preferred modified whey solids product has the following typical analysis (by weight):
Protein (N×6.38)—about 16.8%
Lactose—about 41.6%
Minerals—about 32.3%
Moisture—about 3.0%
Lactate—about 2.5%
Citrate—about 3.1%
Fat—about 1.0%
pH (3% solution)—about 6.2
Calories per 100 grams about 242.

The process for forming the modified whey solids product by means of the Attebery patent comprises the addition of a divalent metal ion, such as calcium, to a raw whey feed at temperatures below about 140° F. (60° C.) and adjusting the pH to a value above about 6, thereby causing precipitation of the modified whey solids product.

The process for forming modified whey solids product by the Grindstaff patent comprises adjusting the pH of a raw whey feed containing at least about 20% acid whey to between about 6.5 to about 8 by the addition of a base whereby insoluble solids are formed within the raw whey feed. These insoluble solids are separated from the whey feed and are collected as modified whey solids product produced by the teachings of the Grindstaff patent.

The separated insoluble solids are generally obtained in the form of an aqueous mixture containing about 10% total solids. The solids content can vary according to the degree of water removal effected during the recovery of solids.

The aqueous mixture may be further processed by adding calcium ion thereto at a concentration of between about 0.002 grams to about 0.010 grams calcium ion per gram of insoluble solids (dry basis) contained in the mixture for the purpose of this invention, the calcium ion addition is effected by using a food grade calcium salt, as for example calcium dihydrogen phosphate, calcium chloride or calcium acetate, though calcium dihydrogen phosphate is preferred.

The calcium treated mixture is then heated at an elevated temperature of between about 125° F. (51.5° C.) to about 200° F. (93° C.) for a period of time to form a "calcium-heat-conditioned mixture". Likewise the aqueous mixture may be heat conditioned without calcium treatment.

The "heat conditioned mixture" can then be dried by conventional methods, i.e. spray drying.

This invention envisions that any of the aforementioned compositions which contain the insoluble solids may be used as the modified whey solids product. It is preferred that the modified whey solids product be the dried calcium-heat conditioned mixture.

DRIED SWEET WHEY

The non-fat dry milk substitute product can contain therein dried sweet whey. Preferably the dried sweet whey is present in the non-fat dry milk substitute product in a weight ratio (dry basis) of dried sweet whey to lactalbumin of from about 2:1 to about 5:1. It is particularly preferred that the quantity of dried sweet whey in the non-fat dry milk substitute product be about the same as the quantity of modified whey solids. By the use of the term "dried sweet whey" it is meant a product produced by the separation and removal of coagulated casein produced by the addition of a proteolytic enzyme to milk, i.e. cheddar cheese whey, swiss cheese whey, mozzarella cheese whey or mixtures thereof which is dried, preferably by spray drying.

DRIED DEPROTEINIZED WHEY

The non-fat dry milk substitute product can contain therein a dried deproteinized whey. Preferably the dried deproteinized whey is present in the non-fat dry milk substitute product in a weight ratio (dry basis) of dried deproteinized whey to lactalbumin of from about 2.:1 to about 4:1. It is particularly preferred that the weight ratio be about 3.:1.

One of the various processes which have been developed to extract protein from whey is the technique of ultrafiltration. The use of ultrafiltration provides a permeate which is high in mineral and lactose. This permeate may be dried to form the dried deproteinized whey used in this invention.

Deproteinized whey can also be obtained as the second fraction from the molecular sieve separation of cheese whey as described in U.S. Pat. No. Re. 27,809.

The dried deproteinized whey has the following typical analysis (by weight):
Lactose—about 70% to about 80%
Minerals—about 10% to about 15%
Protein (N×6.38)—about 4–8%
Moisture—less than about 5%
Fat—less than about 1%
pH about 6 to about 7

More specifically, the deproteinized whey can be obtained by the ultrafiltration of whey. The deproteinized whey can then be dried, for example by freeze drying. Ultrafiltration membranes are utilized to separate the high molecular weight fraction of whey (the protein) from the liquid and low molecular materials. The protein enriched solution retained by the membranes is called the "retentate". The water and low molecular weight fraction which passed through the membrane is called the "permeate". The permeate is then dried to form dried deproteinized whey used in this invention. An illustrative method for ultrafiltration is described by Horton, B. S. et al., Food Technology, Volume 26, 1972.

For example, an acid or cottage cheese whey concentrate containing from about 40% to about 60% and preferably from about 45% to about 55% whey protein is neutralized to a pH of 6.5 with caustic and allowed to settle. The pH is then adjusted to 7.2 and any solids or precipitates are removed by centrifugal clarification. The clarified liquor is then pasteurized and fed into the ultrafiltration membrane unit. The retentate is condensed and spray dried. The liquid permeate may then be dried and used in the composition of the present invention.

The dried deproteinized whey used in the non-fat dry milk substitute product of this invention can also be obtained by passing a partially delactosed whey mother liquor through a bed of molecular sieve resin in accordance with U.S. Pat. No. Re. 27,809, and recovering, the "eluate" consisting of the low molecular weight second fraction containing mainly lactose, minerals and residual protein. The "eluate" can then be dried, for example by freeze drying to form the dried deproteinized whey used in this invention.

If desired, the whey can be pretreated to clarify the whey using processed such as illustrated in U.S. Pat. No. 3,060,219 and the Grindstaff patent.

DELACTOSED-DEPROTEINIZED WHEY COMPOSITION

Preferably the non-fat dry milk substitute product contains a delactosed-deproteinized whey. The delactosed-deproteinized whey is obtained by the concentration and/or cooling of the aforedescribed deproteinized whey to effect the precipitation of lactose.

Preferably the delactosed-deproteinized whey is present in the non-fat dry milk substitute product in a weight ratio (dry basis) of delactosed-deproteinized whey composition to lactalbumin of from about 3.:1 to about 4.:1. It is particularly preferred that the weight ratio be about 3.5:1.

A typical analysis for a delactosed-deproteinized whey is as follows:
Lactose, % (d.b.)—about 20% to about 30%
Minerals, % (d.b.)—about 25% to about 40%
Protein (N×6.38) %(d.b.)—about 7% to about 12%
Fat, % (d.b.)—about 0% to about 1.%
Moisture—about 63% to about 70%
pH—about 6.5 to about 7.5

Delactosed-deproteinized whey composition is difficult to dry alone. It is therefore desirable to either: (a) formulate the non-fat dry milk substitute product from the delactosed-deproteinized whey composition with the moisture contained therein contributing to the moisture content of the cheese product; or (b) co-dry the formulated non-fat dry milk substitute product prior to use in the cheese product.

It has been found that the use of the low-cost non-fat dry milk substitute products of this invention in cheese products do not adversely effect the properties of the cheese products.

The present invention is further illustrated in the examples which follow:

EXAMPLES 1-3

NON-FAT DRY MILK SUBSTITUTE PRODUCT

The following non-fat dry milk substitute products were formulated:

| | COMPOSITION, % (By Weight, Dry Basis) | | | | | | | |
|---|---|---|---|---|---|---|---|---|
| | Lactalbumin | Modified Whey Solids | Sodium Hexametaphosphate | Dried Sweet Whey | Dried Deproteinized Whey | Delactosed Deproteinized Whey | Protein Content | Estimated Cost(c) |
| EXAMPLE 1 | 9.8 | 44.6 | 1.0 | 44.6 | — | — | 20.6 | 23. |
| COMPARATIVE EXAMPLE 1A | 10. | 45. | — | 45.0 | — | — | 20.6 | — |
| EXAMPLE 2 | 14.8 | 39.6 | 1.0 | — | 44.6 | — | 20.0 | 23.-25 |
| COMPARATIVE EXAMPLE 2A | 15. | 40.0 | — | — | 45. | — | 20.0 | — |
| EXAMPLE 3 | 10.9 | 49.5 | 1.0 | — | — | 38.6 | 21.8 | 23-25 |

EXAMPLE 4

Six cheese products were formulated.

Five of the cheese products contained a non-fat dry milk substitute product of Examples 1, 1A, 2A and 3. These cheese products had the composition indicated in TABLE I—"Cheese Products".

A sixth cheese product contained non-fat dry milk. This cheese product had the composition indicated in TABLE I—"Cheese Product Control".

TABLE I

| Ingredients | Cheese Product Control, %[1] | Cheese Product of this Invention |
|---|---|---|
| Cheese, raw(80% young and 20% aged) | 61.0 | 61.0 |
| Water | 25.4 | 25.4 |
| Dried Sweet Whey | 6.0 | 6.0 |
| Salt | 0.5 | 0.5 |
| Emulsifier: | | |
| Disodium Phosphate | 3.0 (d.b.) | 3.0 (d.b.) |
| Non-Fat-Dry Milk | 4.0 | 1.0 |
| Potassium Sorbate | 0.1 | 0.1 |
| Non-Fat-Dry Milk Substitute Product | — | — |
| | 100.0 | 100.0 |

The cheese, emulsifiers, dried sweet whey, non-fat dry milk, salt and potassium sorbate were blended in the bowl of a Brabender Plastograph which had been preheated to 185° F. (85° C.). Approximately ⅓ of the cheese was added, then the dry ingredients. The remaining cheese was added and then the water. About 5% of the water was added by steam being applied throughout the entire process by a distillation flask. Cheese temperature at the end of the processing was approximately 180° F. (82° C.).

The mixing was at 75 envelopes per minute for about 5 minutes. The cheese was cooled and stored in the refrigerator overnight. The next day, the cheese was allowed to warm to room temperature and evaluated for melt, moisture, pH, melt character, hardness, brittleness, adhesiveness, cohesiveness and flavor.

As indicated by the data shown in TABLE II, the "Cheese Products" containing the non-fat dry milk substitute products of this invention (Examples 1, 2 and 3) were equal to or similar in functionality to the "Cheese Product Control" containing only the non-fat dry milk. Taste was substantially the same for each cheese product sample.

Additionally, the "Cheese Products" containing the non-fat dry milk substitute product without the sodium hexametaphosphate (Comparative Examples 1A and 2A) were inferior in texture and body to the "Cheese Product Control" and the "Cheese Products" of this invention. It should be noted that the sodium hexametaphosphate is only present in the cheese products of this invention to the extent of about 0.03%.

TABLE II

EVALUATION RESULTS

| | | CHEESE PRODUCTS CONTAINING NON-FAT DRY MILK SUBSTITUTE PRODUCT OF: | | | | |
|---|---|---|---|---|---|---|
| | | EXAMPLES | | | | |
| SAMPLE | CHEESE PRODUCT CONTROL | 1 | 1A | 2 | 2A | 3 |
| (12.7/16) inch Melt % | 41.1 | 60.7 | 67.3 | 51.8 | 61.4 | 58.9 |
| 3.8 cm Melt % | 100.0 | 100.0 | 117. | 117.0 | 100. | 100.0 |
| Moisture % | 47.4 | 47.3 | * | 46.9 | * | 46.8 |
| pH | 5.9 | 6.1 | * | 6.0 | * | 6.0 |
| Melt Character | 5.0 | 5.0 | 5 | 5.0 | 5 | 5.0 |
| Instron Measurements | | | | | | |
| Hardness (lbs) | 11.3 | 9.2 | 4.8 | 9.5 | 4.7 | 9.0 |
| Brittleness (lbs) | 14.7 | 13.1 | 3.2 | 13.6 | 3.3 | 14.1 |
| Adhesiveness (Sq. In.) | 0.64 | 0.60 | .61 | 0.85 | 1.05 | 0.72 |

TABLE II-continued
EVALUATION RESULTS

| | | CHEESE PRODUCTS CONTAINING NON-FAT DRY MILK SUBSTITUTE PRODUCT OF: | | | | |
|---|---|---|---|---|---|---|
| | | EXAMPLES | | | | |
| SAMPLE | CHEESE PRODUCT CONTROL | 1 | 1A | 2 | 2A | 3 |
| Cohesiveness (Sq. In.) | 0.171 | 0.134 | .716 | 0.186 | .273 | 0.161 |

*No measurements taken

The "(12.7/16) inch Melt" was determined by preparing two mm thick by (12.7/16) inch diameter cheese plugs per sample, using a No. 15 cork borer. The plugs were placed in an uncovered top pan of a double boiler, the bottom pan containing boiling water. Heat was applied for 4 minutes. The diameter of each of the plugs was measured with a caliper. Four measurements per cheese sample were taken. The percent melt was calculated by the following formula:

$$\frac{[\text{Average of 4 measurements} - (12.7/16)] \times 100}{(12.7/16)}$$

The "3.8 cm Melt" was determined by taking one 6 mm thick by 3.8 cm diameter cheese plug (using a 3.8 cm ID metal cylinder) per sample. The plug was placed in the center of a small Petri dish which was covered. The covered dish was then placed in a 450° F. (232° C.) oven for 5 minutes. With the melted plug still in the dish, the cheese was centered over a diagram of 10 concentric circles ⅛" apart. Each concentric circle corresponded to a percent melt ranging from 0% for the innermost circle to 150% for the outermost circle. The circle which the outer edge of the cheese reached was the percent melt.

"Melt Character" was based on the symmetry, surface smoothness and diameter of the melted plug in the "(12.7/16) inch Melt" test; a rapid moisture oven was used for percent moisture; and a standard pH meter for pH.

Tests on hardness, brittleness, adhesiveness and cohesiveness were made with an Instron instrument and determinations of these factors made pursuant to SZCZESNIAK, A. S. 1963, "Classification of Textural Characteristics", J. Food Science, 28, 385.

The hardness (measured in pounds) is defined as the force necessary to attain a given deformation. The larger the force, the harder the cheese.

The brittleness (measured in pounds) is defined as the force with which the material fractures. Therefore, the lower the force, the more brittle the cheese.

The adhesiveness (measured in square inches) is defined as the work necessary to overcome the attractive forces between the surface of the food and the surface of other materials. Therefore, the larger the adhesiveness, the more adhesive is the cheese.

The cohesiveness is defined as the strength of the internal bonds making up the body of the product. As cohesiveness approaches 1, the cheese becomes extremely cohesive.

What is claimed is:

1. A non-fat dry milk substitute product comprising lactalbumin, sodium hexametaphosphate and a modified whey solids product derived from a process of adding a divalent metal ion to a raw whey feed and adjusting the pH to a value above about 6 at a temperature below about 140° F. (60° C.) thereby causing precipitation of the modified whey solids product;
   wherein the protein content of the non-fat dry milk substitute product is from about 17% to about 30%, (by weight, dry basis);
   wherein the weight ratio (dry basis) of modified whey solids to lactalbumin is from about 2:1 to about 5:1; and
   wherein the weight ratio (dry basis) of sodium hexametaphosphate to lactalbumin is from about 0.05:1 to about 0.20:1.

2. The non-fat dry milk substitute product of claim 1, wherein the lactalbumin is an isoelectric lactalbumin.

3. The non-fat dry milk substitute product of claim 1, further comprising dried sweet whey.

4. The non-fat dry milk substitute product of claim 1, further comprising a dried deproteinized whey.

5. The non-fat dry milk substitute product of claim 1, further comprising a delactosed-deproteinized whey.

6. The non-fat dry milk substitute product of claim 1, wherein the protein content is from about 19% to about 23%.

7. The non-fat dry milk substitute product of claim 1, wherein the protein content is about 20%.

8. The non-fat dry milk substitute product of claim 1, wherein the lactalbumin is present in a quantity (by weight, dry basis) of from about 9% to about 15%.

9. The non-fat dry milk substitute product of claim 1, wherein the modified whey solids product contains by weight about 15% to about 27% protein, about 23% to about 54% lactose, and about 24% to about 60% minerals.

10. The non-fat dry milk substitute product of claim 3, wherein the weight ratio (dry basis) of dried sweet whey to lactalbumin is from about 2:1 to about 5:1.

11. The non-fat dry milk substitute product of claim 3, wherein the quantity of dried sweet whey is about the same as the quantity of modified whey solids.

12. The non-fat dry milk substitute product of claim 4, wherein the weight ratio (dry basis) of dried deproteinized whey to lactalbumin is from about 2:1 to about 4:1.

13. The non-fat dry milk substitute product of claim 4, wherein the weight ratio (dry basis) of dried deproteinized whey to lactalbumin is about 3:1.

14. The non-fat dry milk substitute product of claim 4, wherein the dried deproteinized whey contains by weight, about 4% to about 8% protein and about 70% to about 80% lactose.

15. The non-fat dry milk substitute product of claim 5, wherein the weight ratio (dry basis) of delactosed-deproteinized whey to lactalbumin is from about 3:1 to about 4:1.

16. The non-fat dry milk substitute product of claim 5, wherein the weight ratio (dry basis) of delactosed-deproteinized whey to lactalbumin is about 3.5:1.

17. A cheese product wherein the non-fat dry milk contained therein is replaced by at least 75%, by weight, by the non-fat dry milk substitute product of claim 1.

18. A cheese product having contained therein, by weight, from about 2% to about 6% of the non-fat dry milk substitute product of claim 1.

19. A cheese product having contained therein, by weight, from about 1% to about 12% of the non-fat dry milk substitute product of claim 1.

20. The cheese product of claim 19, wherein the cheese product is pasteurized processed cheese food.

21. The cheese product of claim 19, wherein the cheese product is pasteurized processed cheese spread.

22. The cheese product of claim 19, wherein the cheese product is imitation cheese spread.

23. A non-fat dry milk substitute product comprising lactalbumin, sodium hexametaphosphate and a modified whey solids product derived from a process of adjusting the pH of a raw whey feed containing at least about 20% acid whey to a value between about 6.5 and about 8, thereby causing the precipitation of the modified whey solids product;
wherein the protein content of the non-fat dry milk substitute product is from about 17% to about 30%, by weight, (dry basis);
wherein the weight ratio (dry basis) of modified whey solids to lactalbumin is from about 2:1 to about 5:1; and
wherein the weight ratio (dry basis) of sodium hexametaphosphate to lactalbumin is from about 0.05:1 to about 0.20:1.

24. The non-fat dry milk substitute product of claim 23, wherein the lactalbumin is an isoelectric lactalbumin.

25. The non-fat dry milk substitute product of claim 23, further comprising dried sweet whey.

26. The non-fat dry milk substitute product of claim 23, further comprising a dried deproteinized whey.

27. The non-fat dry milk substitute product of claim 23, further comprising a delactosed-deproteinized whey.

28. The non-fat dry milk substitute product of claim 23, wherein the protein content is from about 19% to about 23%.

29. The non-fat dry milk substitute product of claim 23, wherein the protein content is about 20%.

30. The non-fat dry milk substitute product of claim 23, wherein the lactalbumin is present in a quantity (by weight, dry basis) of from about 9% to about 15%.

31. The non-fat dry milk substitute product of claim 23, wherein the modified whey solids product contains by weight about 15% to about 27% protein, about 23% to about 54% lactose, and about 24% to about 60% minerals.

32. The non-fat dry milk substitute product of claim 26, wherein the weight ratio (dry basis) of dried sweet whey to lactalbumin is from about 2:1 to about 5:1.

33. The non-fat dry milk substitute product of claim 25, wherein the quantity of dried sweet whey is about the same as the quantity of modified whey solids.

34. The non-fat dry milk substitute product of claim 26, wherein the weight ratio (dry basis) of dried deproteinized whey to lactalbumin is from about 2:1 to about 4:1.

35. The non-fat dry milk substitute product of claim 26, wherein the weight ratio (dry basis) of dried deproteinized whey to lactalbumin is about 3:1.

36. The non-fat dry milk substitute product of claim 26, wherein the dried deproteinized whey contains by weight, about 4% to about 8% protein and about 70% to about 80% lactose.

37. The non-fat dry milk substitute product of claim 27, wherein the weight ratio (dry basis) of delactosed-deproteinized whey to lactalbumin is from about 3:1 to about 4:1.

38. The non-fat dry milk substitute product of claim 27, wherein the weight ratio (dry basis) of delactosed-deproteinized whey to lactalbumin is about 3.5:1.

39. The non-fat dry milk substitute product of claim 27, wherein the delactosed-deproteinized whey contains (by weight) about 7% to about 12% protein and about 20% to about 30% lactose.

40. A cheese product wherein the non-fat dry milk contained therein is replaced by at least 75%, by weight, by the non-fat dry milk product of claim 23.

41. A cheese product having contained therein, (by weight) from about 2% to about 6% of the non-fat dry milk substitute product of claim 23.

42. A cheese product having contained therein, (by weight) from about 1% to about 12% of the non-fat dry milk substitute product of claim 23.

43. The cheese product of claim 42, wherein the cheese product is pasteurized process cheese food.

44. The cheese product of claim 42, wherein the cheese product is pasteurized process cheese spread.

45. The cheese product of claim 42, wherein the cheese product is imitation cheese spread.

* * * * *

UNITED STATES PATENT AND TRADEMARK OFFICE
CERTIFICATE OF CORRECTION

PATENT NO. : 4,163,069
DATED : July 31, 1979
INVENTOR(S) : Nicholas Melachouris et al.

It is certified that error appears in the above-identified patent and that said Letters Patent are hereby corrected as shown below:

Col. 2, lines 5 and 6, "hexameta phosphate" should read -- hexametaphosphate --;

Col. 2, line 10, "above above" should read -- above about --;

Col. 3, line 50, "substitue" should read -- substitute --;

Col. 4, line 26, "heat" should read -- heating --;

Col. 7, line 68, "27,809" should read -- 27,806 --;

Col. 8, line 38, "27,809" should read -- 27,806 --;

Col. 8, line 45, after "processed" insert -- cheese --;

Cols. 9 and 10, Table 1, insert footnote -- [1]all percentages are by weight --; and Col. 11, line 19, "caliber" should read -- caliper --.

Signed and Sealed this

Eleventh Day of December 1979

[SEAL]

Attest:

SIDNEY A. DIAMOND

Attesting Officer

Commissioner of Patents and Trademarks